(12) United States Patent
Azad et al.

(10) Patent No.: US 10,714,779 B2
(45) Date of Patent: Jul. 14, 2020

(54) PROTON CONDUCTING ELECTROLYTE COMPOSITION AND METHOD OF PREPARATION THEREOF

(71) Applicant: Universiti Brunei Darussalam, Gadong (BN)

(72) Inventors: Abul Kalam Azad, Gadong (BN); Mohamad Iskandar Petra, Gadong (BN); Nikdalila Radenahmad, Gadong (BN)

(73) Assignee: UNIVERSITI BRUNEI DARUSSALAM, Gadong (BN)

( * ) Notice: Subject to any disclaimer, the term of this patent is extended or adjusted under 35 U.S.C. 154(b) by 0 days.

(21) Appl. No.: 15/672,220

(22) Filed: Aug. 8, 2017

(65) Prior Publication Data

US 2018/0323462 A1 Nov. 8, 2018

(30) Foreign Application Priority Data

Aug. 8, 2016 (BN) ........................ BN/N/2016/0059

(51) Int. Cl.
*H01M 8/126* (2016.01)
*H01M 8/1253* (2016.01)
*C01G 25/00* (2006.01)

(52) U.S. Cl.
CPC .......... *H01M 8/126* (2013.01); *C01G 25/006* (2013.01); *H01M 8/1253* (2013.01); *C01P 2002/52* (2013.01); *C01P 2002/72* (2013.01); *C01P 2002/76* (2013.01); *C01P 2002/77* (2013.01); *C01P 2002/88* (2013.01); *C01P 2004/03* (2013.01); *C01P 2004/51* (2013.01); *C01P 2004/53* (2013.01); *C01P 2006/40* (2013.01); *H01M 2300/0071* (2013.01)

(58) Field of Classification Search
CPC ............... H01M 8/126; H01M 8/1253; H01M 2300/0071; C01G 25/006; C01P 2002/88; C01P 2002/52; C01P 2002/72; C01P 2002/77; C01P 2002/76; C01P 2004/03; C01P 2004/51; C01P 2004/53; C01P 2006/40

See application file for complete search history.

(56) References Cited

U.S. PATENT DOCUMENTS

2017/0149082 A1\* 5/2017 Thangadural ........ C01G 25/006

\* cited by examiner

*Primary Examiner* — Stephen J Yanchuk
(74) *Attorney, Agent, or Firm* — Sinorica, LLC (57) ABSTRACT

The present invention relates to an electrolyte composition and method of making thereof. The proton conducting electrolyte composition i.e. $Sr_{1-x}Ba_xCe_{0.5}Zr_{0.35}Y_{0.1}Sm_{0.05}O_{3-\delta}$, comprises combination of doped $BaCeO_3$ and $BaZrO_3$ by their doping in Sr, Y, and Sm, wherein x=0 to 0.99, and δ=0 to 0.1. The proton conducting electrolyte is used as at least one component, among others, of Solid Oxide Fuel Cells such Solid Oxide Fuel Cell (SOFC) can easily be operated at intermediate temperature about 600° C. thereby making the SOFC cost effective and reliable and showing highest power density.

7 Claims, 8 Drawing Sheets

PROTON CONDUCTING ELECTROLYTE COMPOSITION AND METHOD OF PREPARATION THEREOF

RELATED APPLICATION

This application claims the benefit of Brunei Application No. BN/N/2016/0059 filed on Aug. 8, 2016 and entitled "A Proton Conducting Electrolyte Composition and Method of Preparation thereof", the content of which is incorporated in its entirety herein by reference.

FIELD OF THE INVENTION

The present invention is related to a Solid Oxide Fuel Cell (SOFC) which can operate at intermediate temperature. More particularly, it relates to proton conducting electrolyte compositions and method of making thereof. The proton conducting electrolyte is used as at least one component, among others, of Solid Oxide Fuel Cells.

BACKGROUND OF THE INVENTION

With the purpose in searching green energy resources, SOFC has become alternative choice since it is practicable in variety of fuels and low emission. The state-of-the-art oxide ion conducting electrolyte for SOFC is yttria-stabilized zirconia (YSZ) which operates at high temperature (800° C.-1000° C.). Due to some disadvantages of high temperature operation, intermediate temperature solid oxide fuel cells (IT-SOFCs) are becoming more and more attractive.

Proton conducting generally electrolytes operates at 400-700° C. In this intermediate temperature range, several perovskite electrolytes i.e. $ABO_3$ exhibit good electrochemical properties in term of proton conductivity. Although using oxide ion conductor in SOFC is typical, the troubles are still presence in terms of mismatched materials, low tolerance in operating conditions and fuel efficiencies. Enhanced proton conductor shows promise to improve the performances in operating. Higher efficiency of proton conducting solid oxide fuel cell (SOFC—$H^+$) than oxide ion conducting solid oxide fuel cell (SOFC—$O^{2-}$) can be obtained although its maximum voltage and power density are still lower. The doped $BaCeO_3$ has been found to be one of the best proton conductors but it is unstable in $CO_2$ and $H_2O$ containing atmosphere. The conductivity of $BaZrO_3$ is less than $BaCeO_3$ but stable under $CO_2$ and steam atmosphere, particularly 10 mol % Y doped $BaZrO_3$.

The Combination of doped $BaCeO_3$ and $BaZrO_3$ has become motivating due to their high proton conductivity and good stability in humid atmosphere. Several dopants have been studied in order to improve stability and conductivity. In most of the works, some percentage of Ce and/or Zr was substituted by tri-valent cations like Y, Yb, Sc, Pr, Sm etc. at the B-site to make oxygen vacancies to enhance the proton conductivity. Hence, Ce was doped by Zr to increase proton conductivity and chemical stability as investigating on $BaCe_{0.9-x}Zr_xY_{0.1}O_{2.95}$ series which show good chemical stability in steam and carbon dioxide atmospheres. Y doping shows potential to enhance conductivity in conventional materials of $BaZrO_3$ and $BaCeO_3$. Y doped $BaZrO_3$ exhibit high conductivity of 7.38 mS/cm at 650° C. Percentage of Ce at B-site has strong effect on proton concentration in perovskite materials.

Sm-doped proton conductors also show promising performance for ITSOFCs. However, very little work has been done to substitute Ba by Sr or Ca which can also have good effect on protonic conductivity.

U.S. Pat. No. 5,387,330 describes a proton conducting oxides BaCe1–xMxO3, where M is a metal dopant, have high proton conductivity at elevated temperatures. Likewise, U.S. Pat. Nos. 6,235,417 and 6,296,687 also disclose electrode materials for SOFCs. U.S. Pat. Nos. 7,842,200, 7,413,678, and 8,012,380 are relevant to the present invention which relates the development of proton conducting electrolytes.

There exist some other patent i.e. U.S. Pat. No. 8,932,781, US20130143142A1, and US2011195342A2 and non-patent prior art (Kang-Rong Lee (a, b), DOI: 10.1016/j.ijhydene.2013.01.043) which disclose proton conducting electrolyte for intermediate temperature solid oxide fuel cell, and fuel cells. However, none of them discloses a combination of doped BaCeO3 and BaZrO3 by doping Sr, Y, and Sm metals.

In order to overcome the aforementioned problems, significant efforts have been devoted to the development of new proton conducting electrolyte for SOFCs.

The present invention discloses a novel proton conducting electrolyte composition having good protonic conductivity and chemical stability at low temperature.

OBJECT OF THE INVENTION

Accordingly, one object of the present invention is to provide a proton conducting electrolyte characterized by having high proton conductivity and good chemical stability in $CO_2$ and/or $H_2O$ environment.

Other object of the present invention is to provide a proton conducting electrolyte for Solid Oxide Fuel Cell (SOFC) which can operate at intermediate temperature.

Another object of the present invention is to provide an electrolyte composition i.e. $Sr_{1-x}Ba_xCe_{0.5}Zr_{0.35}Y_{0.1}Sm_{0.05}O_{3-\delta}$, wherein x=0.0, 0.1, 0.3, 0.5, 0.7, and 0.9, having good protonic conductivity and chemical stability at low temperature.

Yet another object of the present invention is to provide a new proton conducting material, $Sr_{0.1}Ba_{0.9}Ce_{0.5}Zr_{0.35}Y_{0.1}Sm_{0.05}O_{3-\delta}$ (SBCZYSm) exhibiting highest power density at temperature intermediate temperature.

One more object of the present invention is to provide a process of making of $Sr_{1-x}Ba_xCe_{0.5}Zr_{0.35}Y_{0.1}Sm_{0.05}O_{3-\delta}$, wherein x=0.0, 0.1, 0.3, 0.5, 0.7, and 0.9 having good protonic conductivity and chemical stability at low temperature.

One further object of the present invention is to provide a process of preparation of $Ni_{0.8}Co_{0.15}Al_{0.05}Li$-oxide (NCAL)/$Sr_{0.1}Ba_{0.9}Ce_{0.5}Zr_{0.35}Y_{0.1}Sm_{0.05}O_{3-\delta}$ (SBCZYSm)/NACL fuel cells exhibiting highest power densities at intermediate temperature and good chemical stability.

Yet another object of the present invention is to develop Solid Oxide Fuel Cells (SOFCs) to provide reasonable power output at intermediate temperature thereby making SOFCs both more cost effective and significant reduction in start-up times.

Further object of the present invention is to provide embodiments that include chemical compositions, structures, anodes, cathodes, electrolytes for solid oxide fuel cells, solid oxide fuel cells, fuel cells, fuel cell membranes, separation membranes, catalytic membranes, sensors, coatings for electrolytes, electrodes, membranes, and catalysts, and the like.

Other objects and advantages of the present invention will be more apparent from the following description which is not intended to limit the scope of the present invention.

SUMMARY OF THE INVENTION

In one aspect, the embodiments of the present invention include chemical compositions, structures, anodes, cathodes, electrolytes for solid oxide fuel cells, fuel cells, fuel cell and the like, are disclosed.

In other aspect, one exemplary chemical composition, among others, includes: $Sr_{1-x}Ba_xCe_{0.5}Zr_{0.35}Y_{0.1}Sm_{0.05}O_{3-\delta}$, comprises combination of doped $BaCeO_3$ and $BaZrO_3$ by their doping in Sr, Y, and Sm, wherein x=0 to 0.99, and $\delta$=0 to 0.1.

In one aspect, a process for preparing an electrolyte composition is provided, the process comprising contacting stoichiometric amount of SrO, $BaCO_3$, $CeO_2$, $ZrO_2$, $Y_2O_3$, and $Sm_2O_3$ powders to mix them together in presence of ethanol; grinding the mix using agate mortar and pestle; and sintering the mixed powders to obtain the electrolyte composition which shows highest power density at temperature about 600° C.

In another aspect subsequent doping of Sr, Y and Sm is done to improve their performance. The sintering temperatures and heating and cooling rates are also important to achieve the desired composition. The firing can be performed at about 950° C. for 8 hours in powder form and at about 1400° C. to 1450° C. for 8 hours in pellet form. The final sintering temperature (1450° C.) with the heating and cooling rate of 5° C./min is critical to the process.

In further aspect, a proton conducting electrolyte is used as at least one component, among others, of Solid Oxide Fuel Cells such Solid Oxide Fuel Cell (SOFC) can easily be operated at intermediate temperature about 600° C. thereby making the SOFC cost effective and reliable and showing highest power density.

DETAILED DESCRIPTION OF DRAWINGS

DETAILED DESCRIPTION OF THE INVENTION

Various embodiments are described hereinafter. It should be noted that the specific embodiments are not intended as an exhaustive description or as a limitation to the broader aspects discussed herein. One aspect described in conjunction with a particular embodiment is not necessarily limited to that embodiment and can be practiced with any other embodiment(s).

As used herein, "about" will be understood by persons of ordinary skill in the art and will vary to some extent depending upon the context in which it is used. If there are uses of the term which are not clear to persons of ordinary skill in the art, given the context in which it is used, "about" will mean up to plus or minus 10% of the particular term.

The use of the terms "a" and "an" and "the" and similar referents in the context of describing the elements (especially in the context of the following claims) are to be construed to cover both the singular and the plural, unless otherwise indicated herein or clearly contradicted by context. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the embodiments and does not pose a limitation on the scope of the claims unless otherwise stated. No language in the specification should be construed as indicating any non-claimed element as essential.

The term "including" is used to mean "including but not limited to." "Including" and "including but not limited to" are used interchangeably.

Ratios, concentrations, amounts, and other numerical data may be presented herein in a range format. It is to be understood that such range format is used merely for convenience and brevity and should be interpreted flexibly to include not only the numerical values explicitly recited as the limits of the range, but also to include all the individual numerical values or sub-ranges encompassed within that range as if each numerical value and sub-range is explicitly recited.

Unless defined otherwise, all technical and scientific terms used herein have the same meaning as commonly understood by one of ordinary skill in the art to which this disclosure belongs. Although any methods and materials similar or equivalent to those described herein can also be used in the practice or testing of the present disclosure, the preferred methods and materials are described in this disclosure.

As will be apparent to those of skill in the art upon reading this disclosure, each of the individual embodiments described and illustrated herein has discrete components and features which may be readily separated from or combined with the features of any of the other several embodiments without departing from the scope or spirit of the present disclosure. Any recited method can be carried out in the order of events recited or in any other order that is logically possible.

Embodiments of the present disclosure will employ, unless otherwise indicated, techniques of chemistry, material science, physics, and the like, which are within the skill of the art. Such techniques are explained fully in the literature.

In one aspect, there is provided a series of proton conducting electrolyte materials which can suitable be used for making at least one component, among others, of Solid Oxide Fuel Cells (SOFCs). Such SOFCs can be operated at intermediate temperature showing highest power density. In one embodiment, a composition $Sr_{(1-x)}Ba_{(x)}Ce_{(0.5)}Zr_{(0.35)}Y_{(0.1)}Sm_{(0.05)}O_{(3-d)}$ is provided in the present disclosure. The composition can be made by combination of doped $BaCeO_3$ and $BaZrO_3$. In one embodiment they doped $BaCeO_3$ and $BaZrO_3$ can be obtained by triple doping thereof in Sr, Y, and Sm. The value of x decides the amount of Ba and Sr to be used in the composition. The value of X may vary from about 0, about 0.1, about 0.3, about 0.5, about 0.7, about 0.9, and ranges between any two of these values.

Wherein d is defined as "oxygen deficiency" which can be calculated from chemical formula of the composition. In some exemplary embodiments, "oxygen deficiency" can accurately be determined from neutron diffraction methods. In some embodiment the value of d may vary from 0 to 0.1.

As $BaCeO_3$ is best proton conductor but is unstable in $CO_2$ and $H_2O$ containing atmosphere, and $BaZrO_3$ is less conductive but stable under $CO_2$ and stream atmosphere and in particular with 10 mol % Y doped BaZrO3. The combination of $BaCeO_3$ and $BaZrO_3$ in accordance to the process of the present invention is highly proton conductive and has good stability.

In one aspect, the grain size of the materials can be adjusted by changing amount of x. The grain size of the materials can be decreased by increasing amount of x. In some embodiments, increasing composition of x affects the increasing of cell parameters and density on Rietveld refinement with space group of cubic in Pm-3m. In one embodiment, BCZYSm where x=0.7 (BCZYSm70) shows the highest conductivity in wet Argon condition which is 6.42×10-3 S/cm at 700° C.

In some embodiments, a single cell with $Sr_{(0.1)}Ba_{(0.9)}Ce_{(0.5)}Zr_{(0.35)}Y_{(0.1)}Sm_{(0.05)}O_{(3-d)}$ exhibits highest peak power density at about 697 mW/cm2 at temperature about 600° C. This high power density suggests that SBCZYSm90 based fuel cells are very promising solid oxide fuel cells which can work at intermediate temperatures.

In one aspect, the composition $Sr_{(1-x)}Ba_{(x)}Ce_{(0.5)}Zr_{(0.35)}Y_{(0.1)}Sm_{(0.05)}O_{(3-d)}$ can be prepared by solid state reaction, sol-gel and co-precipitation methods. In some embodiments, stoichiometric amount of SrO, $BaCO_3$, $CeO_2$, $ZrO_2$, $Y_2O_3$, and $Sm_2O_3$ powders are mixed together in ethanol and grinded using agate mortar and pestle. In some embodiment's water, acetone or alcohols can alternatively be used to mix the powders. In some embodiments, the mixed powders are sintered in air at temperature about 950° C. for about 8 hours. A hydraulic press can be used to make pallets of required diameter by pressing at a suitable pressure, and sintered at elevated temperature for up to about 8 hours. This embodiment is further illustrated by examples provided in the following paragraphs.

The materials obtained from the process of the present invention have been characterized by using X-ray Diffraction (XRD), Thermogravimetric Analysis (TGA), Scanning Electron Microscopy (SEM), particle size analysis, impedance spectroscopy, and fuel cell measurements. In some embodiments, the fuel cells made by using the above material exhibit peak power densities at lower temperature range from 400° C. to 650° C., which is highest over other fuel cells known in the art.

In one aspect, a device for conducting protons at low temperature about 600° C. is provided which comprises a ceramic body having formula $Ba_{1-x}Sr_xCe_{0.5}Zr_{0.35}Sm_{0.10.1}O_{3-d}$ wherein x is 0 to 1. In one embodiment, SBCZYSm/NACL fuel cells i.e. $Ni_{0.8}Co_{0.15}Al_{0.05}$Li-oxide (NCAL)/$Sr_{0.1}Ba_{0.9}Ce_{0.5}Zr_{0.35}Y_{0.1}Sm_{0.05}O_{3-\delta}$ are provided which exhibit highest power performance and good stability at temperature about 600° C.

The high performance of the NCAL/SBCZYSm/NCAL IT-SOFC, due to high proton conducting SBCZYSm electrolyte, provides a new understanding for the rational development of high performance IT-SOFCs based on electrolytes with significant protonic conduction.

In one aspect of the present invention, a process for making an electrolyte composition i.e. $Sr_{1-x}Ba_xCe_{0.5}Zr_{0.35}Y_{0.1}Sm_{0.05}O_{3-\delta}$, wherein x=0.0, 0.1, 0.3, 0.5, 0.7, and 0.9, having good protonic conductivity and chemical stability at low temperature, is provided.

In one embodiment reaction taking place during the contacting, grinding and sintering of the powders is a solid state reaction. In one embodiment, a hydraulic press can be used to make 13 mm diameter pallets by pressing at pressure about 4 psi and at temperature about 1400° C. In one embodiment, the sintering can be done by processes well known in the art, however, the sintering, particularly for the process of the present invention, takes place at temperature about 1450° C. from about 6 to about 8 hours, preferably up to about 8 hours. In one aspect, the grain size of the composition can be controlled by variable amount of Sr and Ba while keeping the percentage composition of Ce, Zr, Y, and Sm being fixed.

In some embodiments, provided herein is a Solid Oxide Fuel Cell (SOFC) of which at least one component, among others, is made of the electrolyte composition of the present disclosure, wherein the electrolyte is a proton conducting electrolyte and the SOFC can easily be operated at intermediate temperature about 600° C. thereby making the SOFC cost effective and reliable.

In some embodiments, the Solid Oxide Fuel Cell (SOFC) made of the novel and distinct composition i.e. $Sr_{1-x}Ba_xCe_{0.5}Zr_{0.35}Y_{0.1}Sm_{0.05}O_{3-\delta}$, wherein x=0.0, 0.1, 0.3, 0.5, 0.7, and 0.9, shows highest peak power density about 697 mW/cm2 at temperature about 600° C.

The following examples are put forth so as to provide those of ordinary skill in the art with a complete disclosure and description of how to perform the methods and use the compositions and compounds disclosed and claimed herein. Efforts have been made to ensure accuracy with respect to numbers (e.g., amounts, temperature, etc.), but some errors and deviations should be accounted for. Unless indicated otherwise, parts are parts by weight, temperature is in ° C., and pressure is in atmosphere. Standard temperature and pressure are defined as 25° C. and 1 atmosphere.

In one example, related to the above mentioned electrolyte composition, the series of materials $Sr_{1-x}Ba_xCe_{0.5}Zr_{0.35}Y_{0.1}Sm_{0.05}O_{3-\delta}$ where x=0, 0.1, 0.3, 0.5, 0.7 and 0.9 were prepared by solid state reaction method. Stoichiometric amount of SrO, $BaCO_3$, $CeO_2$, $ZrO_2$, $Y_2O_3$ and $Sm_2O_3$ powders were mixed together in ethanol and grinded using agate mortar and pestle. The mixed powders were sintered in air at 950° C. for 8 hours. Hydraulic press was utilized to make 13 mm diameter pallets by pressing at 4 psi and sintered at 1400° C. and 1450° C. for 6 hours and 8 hours, respectively.

X-ray diffraction patterns were obtained from a reflection type Shimadzu-7000 diffractometer (CuKα1=1.5406 Å) in the 2θ range from 10° to 80° in air and performed Rietveld analysis using FullProf[16]. Scanning electron microscopy (SEM) of Phenom ProX was used to examine the feature of material surface. The pallets were dispersed by Pt ions in sputtering device of Quorom Q150RS as conducting surface before painting with Pt paste in about 5.2 mm. Pt diameter on 13 mm. pallet diameter and sintered at 1000° C. for 2 hours. Impedance spectroscopy was carried out by Solartron 1260 impedance analyzer in frequency range of 100 mHz-6 MHz and 1 V rms in signal amplitude from 1000° C. to 150° C. with step of 50° C.

This experiment was operated in wet Argon atmosphere (Ar flowing through water at room temperature). ZView (Scribner Associates Inc.) software was utilized to examine impedance data for analyzing conductivity. The hydration furnace was operated in 0.4 PN2 at 800° C., 600° C., 400° C., 200° C. and 150° C. by dwelling for 2 h, 2 h, 48 h, 2 h and 55 h, respectively. The heating and cooling rate was 200° C./hour until 400° C. and 10° C./h for cooling down to 150° C. The hydrated samples were prepared in order to examine chemical and thermal stability and proton intake capacity by using a NETZSCH Thermogravimetric Analyzer (TGA). It was operated under 20 ml/min constant flow of nitrogen. Particle size analysis was carried out to specify the grain size of particle after manual grinding on mortar and pestle for 10-15 minutes using HORIBA particle size analyzer. Power density was measured in KTH, sweden in the cell arrangement of $Ni_{0.8}Co_{0.15}Al_{0.05}Li$-oxide (NCAL)/ $Sr_{0.1}Ba_{0.9}Ce_{0.5}Zr_{0.35}Y_{0.1}Sm_{0.05}O_{3-\delta}$ (SBCZYSm)/NACL.

Figure 1:
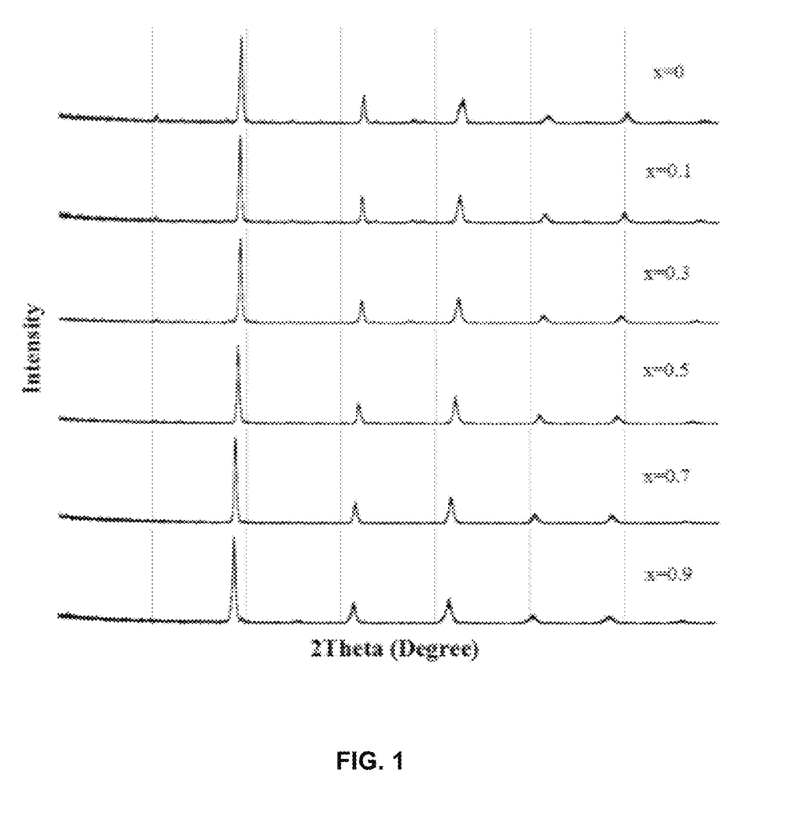
FIG. 1 illustrates comparison of XRD patterns in $Sr_{1-x}Ba_xCe_{0.5}Zr_{0.35}Y_{0.1}Sm_{0.05}O_{3-\delta}$ where x=0, 0.1, 0.3, 0.5, 0.7 and 0.9.

FIG. 1 shows the X-ray diffraction patterns of sintered materials. Indexing of the patterns was performed using the software TREOR90 and subsequent refinements of cell parameters were performed by using Checkcell. Indexing of the patterns shows that all compositions crystallize in the cubic symmetry and cell parameter increases with Sr-doping. Due to the change in unit cell volume, the Bragg reflections shift to the left as shown in FIG. 1.

Figure 2:
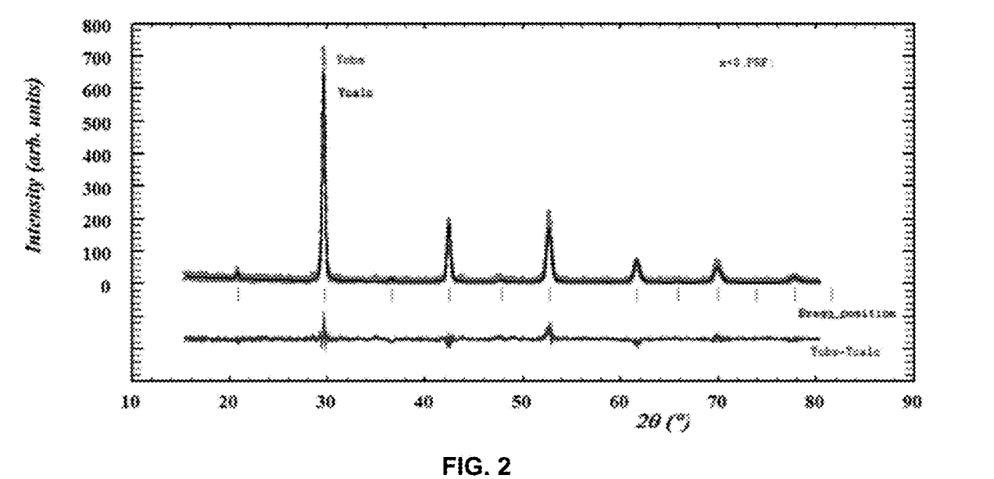
FIG. 2 illustrates Rietveld refinement profile of $Sr_{1-x}Ba_xCe_{0.5}Zr_{0.35}Y_{0.1}Sm_{0.05}O_{3-\delta}$ (x=0.3).

Rietveld analysis of the XRD data confirms that the materials crystallize in the cubic symmetry (space group of Pm-3m). FIG. 2 shows the Rietveld refinement profile of $Sr_{1-x}Ba_xCe_{0.5}Zr_{0.35}Y_{0.1}Sm_{0.05}O_{3-\delta}$ where x=0.3. The unit cell parameters increases with Sr-doping and found to be 4.2103, 4.2248, 4.2508, 4.2668, 4.2876 and 4.3051 Å for x=0, 0.1, 0.3, 0.5, 0.7 and 0.9, respectively. The lattice parameters are comparable to typical perovskite based materials $BaCeO_3$ (a=4.445 Å) and $BaZrO_3$ (a=4.193 Å). The phase structure of $BaCeO_3$—$BaZrO_3$ is highly dependent on the concentration Ce/Zr at the B-site. Typically, Y-doped $BaCeO_3$ is orthorhombic and Y-doped $BaZrO_3$ is cubic. In fact, symmetry and cell parameters can be different in multiple doped $BaCeO_3$ depending on their B-site cation ratios, synthesis route and final sintering temperature. $Sr_{1-x}Ba_xCe_{0.5}Zr_{0.35}Y_{0.1}Sm_{0.05}O_{3-\delta}$ shows orthorhombic structure for x=0.1 and 0.2 while cubic for x≥0.3 [10]. When the Y percentage is little bit more i.e. $Sr_{1-x}Ba_xCe_{0.5}Zr_{0.35}Y_{0.1}Sm_{0.05}O_{3-\delta}$, the phase structure is orthorhombic for x=0.1-0.5 and cubic when x=0.6-0.8. Sm and Y doped $BaCeO_3$ also shows orthorhombic crystal structure. Since the ionic radius of $Y^{3+}$ and $Sm^{3+}$ in 6-coordinated polyhedral is 0.90 Å and 0.958 Å is very close to each other, small percentage of Y and Sm co-doped in $Sr_{1-x}Ba_xCe_{0.5}Zr_{0.35}Y_{0.1}Sm_{0.05}O_{3-\delta}$ shows cubic symmetry due to high concentration of Ce. These studies show the influence of the preparation procedure and sintering temperatures involved for obtaining the materials onto their crystalline structure. Higher calcination temperature, normally used for solid state reaction, might have important effect in changing the symmetry in the crystal structure.

Moreover, since the ionic radius of $Sr^{2+}$ (1.44 Å) is smaller than $Ba^{2+}$ (1.61 Å) in 12 coordinated A-site polyhedral, higher percentage of Ba makes the unit cell volume larger and a clear shifting of reflections to lower angle was observed (see FIG. 1). The variation of cell parameter reveals that Sr was substantially substituted by Ba.

TABLE 1

Summary of the Rietveld refinement results for
$Sr_{1-x}Ba_xCe_{0.5}Zr_{0.35}Y_{0.1}Sm_{0.05}O_{3-\delta}$
(x = 0, 0.1, 0.3, 0.5, 0.7 and 0.9) using the cubic
symmetry (space group Pm-3m).

| Composition | Cell Parameter (Å) | Cell Volume (Å3) | chi$^2$ |
|---|---|---|---|
| x = 0.0 | 4.2103 | 74.634 | 1.54 |
| x = 0.1 | 4.22482 | 75.41 | 1.37 |
| x = 0.3 | 4.25076 | 76.807 | 1.60 |
| x = 0.5 | 4.26676 | 77.677 | 1.40 |
| x = 0.7 | 4.28759 | 78.821 | 1.10 |
| x = 0.9 | 4.30507 | 79.789 | 1.15 |

The density of the materials were calculated using the unit cell volume obtained from Rietveld refinement in the formula, $$D = \frac{Z \times F.W.}{V \times Na} \qquad (1)$$

Where D is the density, Z is no. of formula unit, F.W. is the formula weight, V is the unit cell volume and Na is Avogadro's number. Density increases with Ba doping and for x=0.0, 0.1, 0.3, 0.5, 0.7 and 0.9, the calculated density was 5.625, 5.677, 5.788, 5.936, 6.06 and 6.193 g/cm3, respectively.

Figure 3:
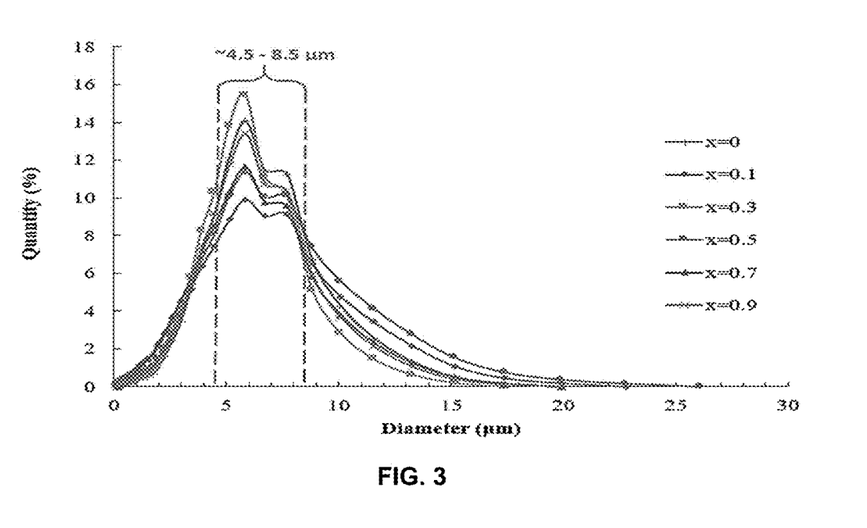
FIG. 3 illustrates particle size distribution of $Sr_{1-x}Ba_xCe_{0.5}Zr_{0.35}Y_{0.1}Sm_{0.05}O_{3-\delta}$ where x=0, 0.1, 0.3, 0.5, 0.7 and 0.9.

The particle size of $Sr_{1-x}Ba_xCe_{0.5}Zr_{0.35}Y_{0.1}Sm_{0.05}O_{3-\delta}$ was shown in FIG. 3 which has no significant peaks order due to each compound was analyzed averagely after preparing by the same method which is grinding with agate mortar and pestle for 10-15 minutes. The particle size of all compounds has great quantity in 4.5-8.5 μm and the diameter of maximum quantity is nearly 5.8 μm in all components. However, the particle size of material is expected to be controlled from preparing by ball milling method to reduce porosity of material which is the requirement of being electrolytes.

Figure 4:
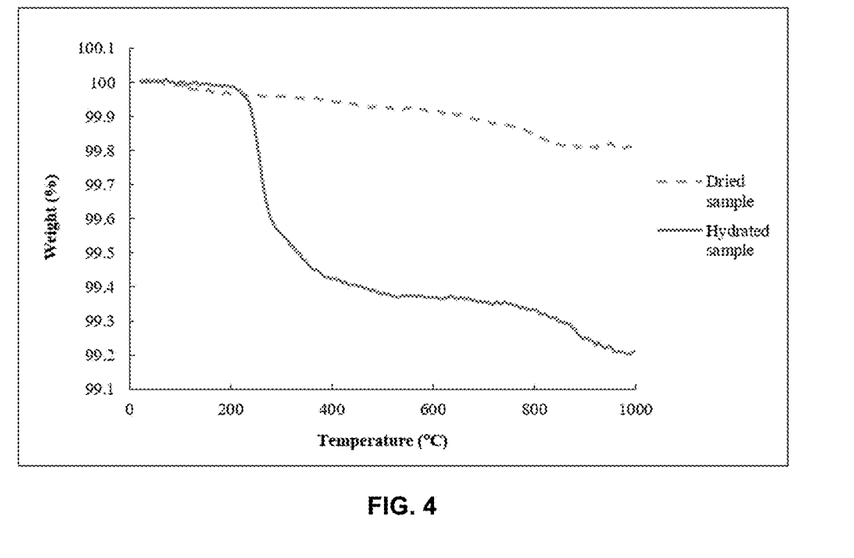
FIG. 4 illustrates TGA plot of dried and hydrated $Sr_{1-x}Ba_xCe_{0.5}Zr_{0.35}Y_{0.1}Sm_{0.05}O_{3-\delta}$ where x=0, 0.1, 0.3, 0.5, 0.7 and 0.9, where x=0.
Figure 5A:
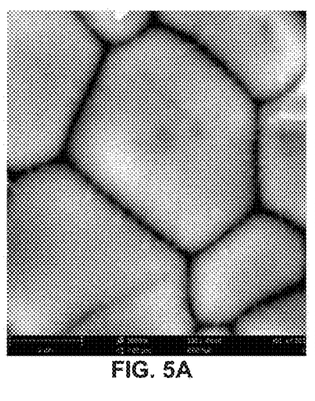
FIG. 5A illustrates SEM images of $Sr_{1-x}Ba_xCe_{0.5}Zr_{0.35}Y_{0.1}Sm_{0.05}O_{3-\delta}$ where x=0.
Figure 5B:
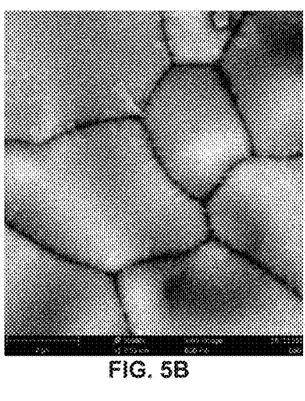
FIG. 5B illustrates SEM images of $Sr_{1-x}Ba_xCe_{0.5}Zr_{0.35}Y_{0.1}Sm_{0.05}O_{3-\delta}$ where x=0.1.
Figure 5C:
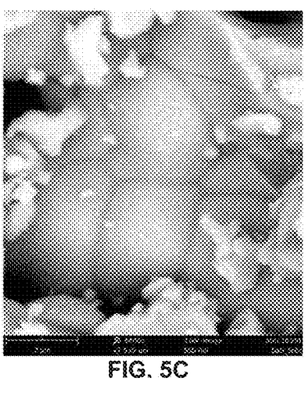
FIG. 5C illustrates SEM images of $Sr_{1-x}Ba_xCe_{0.5}Zr_{0.35}Y_{0.1}Sm_{0.05}O_{3-\delta}$ where x=0.3.
Figure 5D:
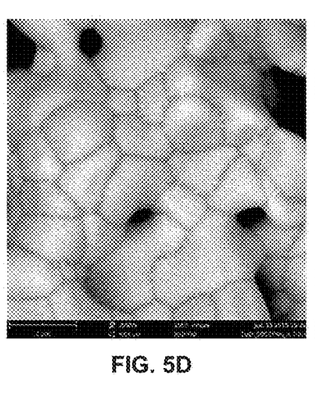
FIG. 5D illustrates SEM images of $Sr_{1-x}Ba_xCe_{0.5}Zr_{0.35}Y_{0.1}Sm_{0.05}O_{3-\delta}$ where x=0.5.
Figure 5E:
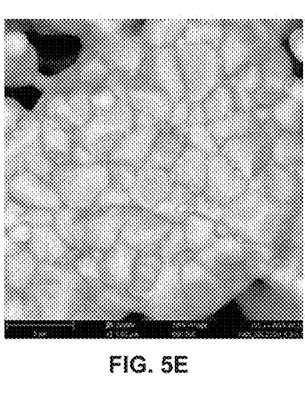
FIG. 5E illustrates SEM images of $Sr_{1-x}Ba_xCe_{0.5}Zr_{0.35}Y_{0.1}Sm_{0.05}O_{3-\delta}$ where x=0.7 s
Figure 5F:
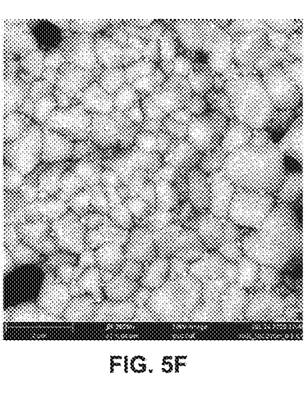
FIG. 5F illustrates SEM images of $Sr_{1-x}Ba_xCe_{0.5}Zr_{0.35}Y_{0.1}Sm_{0.05}O_{3-\delta}$ where x=0.9.

Thermogravimetric analysis was performed using a dried and hydrated sample in the temperature range 20-1000° C. FIG. 4 shows the TGA plot of $Sr_{1-x}Ba_xCe_{0.5}Zr_{0.35}Y_{0.1}Sm_{0.05}O_{3-\delta}$. Hydrated sample shows more weight loss than dried sample and the weight loss started at 200° C. This weight loss at 200° C. indicates the proton loss which was absorbed during the hydration process in the atomic structure making the O—H bond. The location of protons in the structure can be observed from neutron diffraction experiments. The weight loss was about 0.63% at 700° C. which is equivalent to 0.099 oxygen deficiency in an atom and close to the value we got from Rietveld refinement.

Microstructure play a very important role on the properties of the material and even more important in the case of the fuel cell electrolytes that need to be gas tight to prevent the mixing of gaseous reactants. Since in proton conducting oxides, grain boundary resistance is detrimental to total conductivity and an increase in grain size reduces number density of grain boundaries, which obviously results in reduction of grain boundary resistance and hence total ionic conductivity increases but may make it weaker. FIG. 5 shows the SEM images of the morphology of the $Sr_{1-x}Ba_xCe_{0.5}Zr_{0.35}Y_{0.1}Sm_{0.05}O_{3-\delta}$ (x=0.0, 0.1, 0.3, 0.5, 0.7 and 0.9) pellet surfaces sintered at 1450° C. for 8 hours. As can be seen, average grain size decreases from 5 μm to 1 μm with Ba-doping which suggests that sintering activity affects the microstructure. Generally grain growth increases with increase in sintering temperature and duration. For all compositions, grains were well defined and density was high as seen from the images which show potential in applying as electrolyte for SOFCs.

Figure 6:
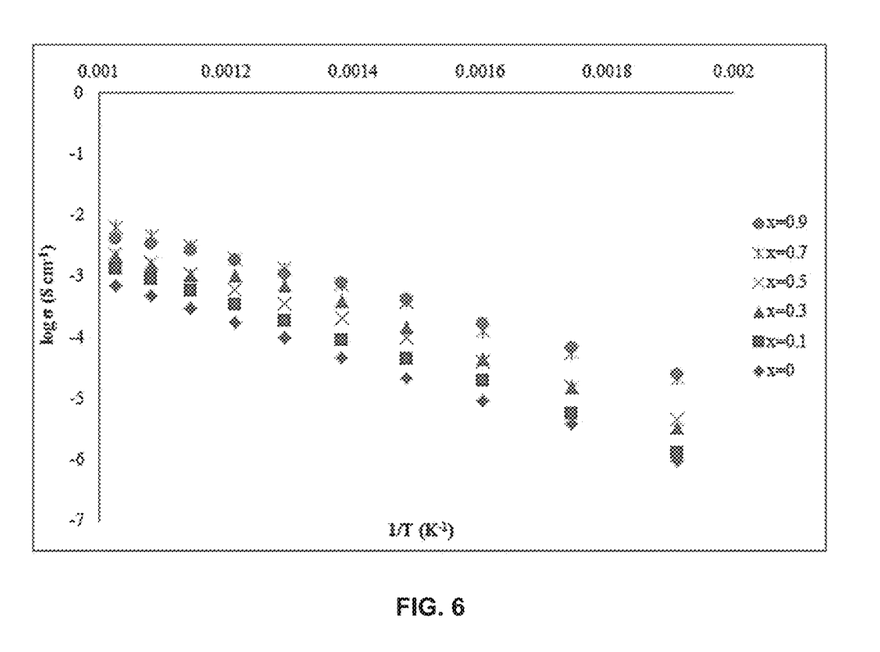
FIG. 6 illustrates relationship between conductivity and temperature in 250-700° C. under total wet Argon of $Sr_{1-x}Ba_xCe_{0.5}Zr_{0.35}Y_{0.1}Sm_{0.05}O_{3-\delta}$ where x=0, 0.1, 0.3, 0.5, 0.7 and 0.9.

FIG. 6 shows the Arrhenius plots of the total ionic conductivity of $Sr_{1-x}Ba_xCe_{0.5}Zr_{0.35}Y_{0.1}Sm_{0.05}O_{3-\delta}$ pellets in wet Ar in the temperature range 250-700° C. As can be found, the conductivity increases with increasing the proportion of Ba in the structure. At 700° C., the maximum conductivity is 6.42×10-3 S/cm for the composition with x=0.7. However, the activation energy on this material is still larger than which of SBCZYSm90. This can indicate that SBCZYSm90 is good conductor as its minimum activation energy with conductivity of 4.17×103 S/cm at 700° C. Table 2 shows the activation energy and conductivity values for all compositions.

At high temperatures, protons in proton conducting perovskites are supposed to follow Grotthuss mechanism and transport in the following steps: i) a proton associated with a fixed oxygen atom; ii) the proton-oxygen born reorients under the influence of the neighboring oxygen atoms; finally iii) the proton starts to oscillate between the two oxygen atoms and eventually moves to the neighboring oxygen. The binding energy between OH. and MB' varies with the dopant. Simulation results shows that the binding energies of OH.-MB' (hydroxyl—dopant pairs at the nearest neighbor sites) for Y, Yb and In were −0.26, −0.35 and −0.58 eV, respectively which had good agreement with the experimental results. A more stable state for hydroxyl-dopant pair will be found for a more negative value of the binding energies.

TABLE 2

Conductivity at 700° C. and activation energy in 250-700° C. of $Sr_{1-x}Ba_xCe_{0.5}Zr_{0.35}Y_{0.1}Sm_{0.05}O_{3-\delta}$

| Composition, x | Conductivity (S/cm) | Activation Energy (kJ/mol) | Activation Energy (eV) |
|---|---|---|---|
| 0 | 7.18E-04 | 61.63 | 0.6388 |
| 0.1 | 1.34E-03 | 64.17 | 0.6651 |
| 0.3 | 2.11E-03 | 60.69 | 0.6290 |
| 0.5 | 2.39E-03 | 58.63 | 0.6076 |
| 0.7 | 6.42E-03 | 54.60 | 0.5659 |
| 0.9 | 4.17E-03 | 49.09 | 0.5088 |

SBCZYSm90 was further investigated as the electrolyte material in a complete cell due to its highest conductivity among the series. The cell was fabricated in two kinds of fuel cell arrangements with structure of NCAL/sample/NCAL and NCAL/sample-LSCF 7:3/NCAL and operated at 600° C. Note that $La_{0.6}Sr_{0.4}Co_{0.2}Fe_{0.8}O_{3-\delta}$ (LSCF) and $Ni_{0.8}Co_{0.15}Al_{0.05}Lioxide$ (NCAL) are commonly used electrode materials for SOFC technology using semiconductorionic materials as the membranes.

Figure 7:
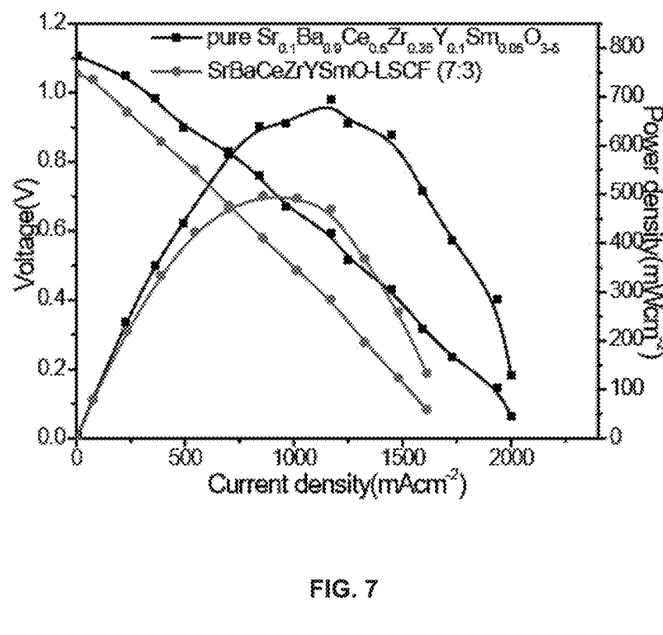
FIG. 7 illustrates I-V and power density curves of the SBCZYSm90 based single cell at 600° C. with wet hydrogen as the fuel and static air as the oxidant.

The I-V and power density curves of the cells are shown in FIG. 7. It can be observed that the cells exhibit excellent power performance. The observed peak power density was 695 mW/cm2 for NACL/SBCZYSm90/NACL and 497 mW/cm2 for NACL/SBCZYSm90-LSCF/NACL with OCV of 1.108 V and 1.05 V, respectively. The cell performance in NACL/SBCZYSm90/NACL arrangement shows the highest compared to the reported values until now as shown in Table 3 [ ]. The cell performance is even better than those ever-reported best performance of $BaZr_{0.1}Ce_{0.7}Y_{0.2}O_{3-d}$ based cells, with peak power densities of 598 and 504 mW/cm2 at 650° C. reported by Yang et al. [ ] and Sun et al. [ ], respectively.

TABLE 3

Power density and Open Circuit Voltage (OCV) of the cells reported in literatures at 600° C.

| Cell | Power density (mWcm$^{-2}$) | Temperature (° C.) | CV (V) | Reference |
|---|---|---|---|---|
| NiO—BaZr0.1Ce0.7Y0.2O3 − δ \|\|BaZr0.3Ce0.5Y0.2O3 − δ \|\| Sm0.5Sr0.5CoO3 − δ—Ce0.8Sm0.2O2 − δ (SSC-SDC) | 396 | 600 | .02 | Z Shi, W Sun, W Liu. JPS 245 (2014) 95395 |
| NiOBaZr0.1Ce0.7Y0.1Yb0.1O3 − δ (BZCYYb) \|\| BZCYYb \|\| BZCYYb-LSCF | *470 1000 | 600 750 | 1.07 .94 | N T Q Nguyen, H H Yoon. JPS 231 (2013) 213-218 |
| Ni—BaZr0.1Ce0.7Y0.2O3 − δ (BZCY) \|\| BaCe0.7In0.2Yb0.1O3 − δ \|\| La0.6Sr0.4Co0.2Fe0.8O3 − δ (LSCF)-BZCY | 150 | 600 | .984 | F Zhao, S Wang, L Dixon, F Chen. JPS 196 (2011) 75007504 |
| Ni—BaZr0.1Ce0.7Y0.1Yb0.1O3 − δ (BZCYYb) \|\| BZCYYb \|\| La0.6Sr0.4Co0.2Fe0.8O3 − δ (LSCF)-BZCYYb | 260 | 600 | .01 | F Zhao, C Jin, C Yang, S Wang, F Chen. JPS 196 (2011) 688-691 |
| NiBaZr0.1Ce0.7Y0.1Yb0.1O3 − δ (BZCYYb) \|\| BZCYYb \|\| PrBaCo2O5 + δ (PBCO) | 223 | 600 | .016 | H Ding, Y Xie, X Xue. JPS 196 (2011) 2602-2607 |
| Ni—BaZr0.1Ce0.7Y0.1Yb0.1O3 − δ (BZCYYb) \|\| BZCYYb \|\| PrBaFe2O5 + δ (PBFO | 179 | 600 | .034 | H Ding, X Xue. JPS 195 (2010) 7038-7041 |

TABLE 3-continued

Power density and Open Circuit Voltage (OCV) of the cells reported in literatures at 600° C.

| Cell | Power density (mWcm$^{-2}$) | Temperature (° C.) | CV (V) | Reference |
|---|---|---|---|---|
| Ni—BaZr0.1Ce0.7Y0.1Yb0.1O3 − δ (BZCYYb) ‖ BZCYYb ‖ La0.6Sr0.4Co0.2Fe0.8O3 − δ (LSCF)-BZCYYb | 530 | 600 | .02 | C Chen, M Liu, Y Bai, L Yang, E Xie, M Liu. E C 13 (2011) 615-618 |
| NiO—ScSZ ‖ ScSZ ‖ La0.8Sr0.2ScyMn1-yO3 − δ (y = 0.0-0.2) | 80, y = 0 200, y = 0.05 | 650 | | H Gua, Y Zhenga, R Rana, Z Shaoa, W Jina, N Xua, J Ahn. JPS 183 (2008) 471478 |
| BaCe0.5Zr0.3Y0.16Zn0.04O3 − δ (BCZYZ)-NiO ‖ BCZYZ ‖ LaSr3Co1.5Fe1.5O10 − δ (LSCF | 175 | 600 | .02 | S Zhanga, L Bi, L Zhang, Z Zaoa, W Suna, H Wang, W Liu. JPS 188 (2009) 343-346 |
| NiO—BaCe0.5Zr0.3Y0.16Zn0.04O3 − δ (BC ZYZ) ‖ BCZYZ ‖ Sm0.5Sr0.5CoO3 − δ (SSC)-BCZYZ | 246 | 600 | .049 | H Ding, X Xue, X Liu G Meng. JAC 494 (2010) 233-235 |

Figure 8A:
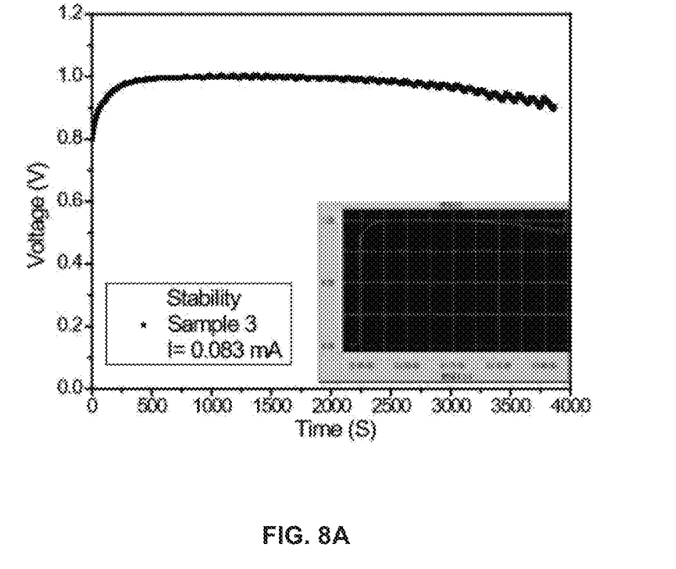
FIG. 8A shows the current-voltage (I-V) characteristics and stability testing of fuel cells with pure sample 3.
Figure 8B:
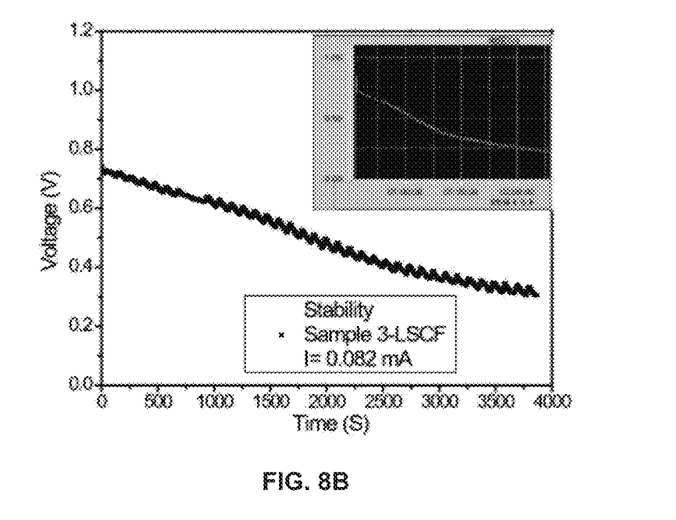
FIG. 8B shows the I-V characteristics and stability testing of fuel cells with sample 3-LSCF.

Moreover, the short-term stability of the cell performance was also tested at 600° C. with the constant voltage. FIG. 8 shows the dependence of power density with elapsed time. The repeated measurement was conducted at 2nd day by using same cells. I-V and stability testing of fuel cells with pure sample 3 and sample 3-LSCF shows that the fuel cell based on sample 3-LSCF obtained enhanced result, with 1.05 v OCV and 497 mW/cm2 output. By introducing LSCF hole conductivity can on one hand increase electron conductivity and on the other hand, also increase proton conductivity through two phase interfaces. Moreover, such proton-semiconductor membrane fuel cell is a new scientific principle based on junction, and matched ion and electron conductivities, thus significantly enhanced power output and in the same time without device short circuiting problem though introducing electron (hole) conducting LSCF up to 30 wt %. The exception is pure SBCZYSm90, as the membrane achieved the highest power output, 695 mWcm2, while further mixing with LSCF decreased first to 310 and 2nd day measurements increased to 497 mW-cm2. This indicates that SBCZYSm90 itself is a good ion-semiconductor material. All these characteristics made this material special and its own can make the best power output.

While mixed with LSCF it can decrease the device performance by unbalanced ion (O2−/H+) and electron conductivities, which can cause i) some OCV decreased, though it is still above 1.0V, most effect is power out-put loss almost to half, then back to 71%.

While certain embodiments have been illustrated and described, it should be understood that changes and modifications can be made therein in accordance with ordinary skill in the art without departing from the technology in its broader aspects as defined in the following claims.

Where a range of values is provided, it is understood that each intervening value, to the tenth of the unit of the lower limit (unless the context clearly dictates otherwise), between the upper and lower limit of that range, and any other stated or intervening value in that stated range, is encompassed within the disclosure. The upper and lower limits of these smaller ranges may independently be included in the smaller ranges and are also encompassed within the disclosure, subject to any specifically excluded limit in the stated range. Where the stated range includes one or both of the limits, ranges excluding either or both of those included limits are also included in the disclosure.

The embodiments, illustratively described herein may suitably be practiced in the absence of any element or elements, limitation or limitations, not specifically disclosed herein. Thus, for example, the terms "comprising," "including," "containing," etc. shall be read expansively and without limitation. Additionally, the terms and expressions employed herein have been used as terms of description and not of limitation, and there is no intention in the use of such terms and expressions of excluding any equivalents of the features shown and described or portions thereof, but it is recognized that various modifications are possible within the scope of the claimed technology. Additionally, the phrase "consisting essentially of" will be understood to include those elements specifically recited and those additional elements that do not materially affect the basic and novel characteristics of the claimed technology. The phrase "consisting of" excludes any element not specified.

The present disclosure is not to be limited in terms of the particular embodiments described in this application. Many modifications and variations can be made without departing from its spirit and scope, as will be apparent to those skilled in the art. Functionally equivalent methods and compositions within the scope of the disclosure, in addition to those enumerated herein, will be apparent to those skilled in the art from the foregoing descriptions. Such modifications and variations are intended to fall within the scope of the appended claims. The present disclosure is to be limited only by the terms of the appended claims, along with the full scope of equivalents to which such claims are entitled. It is to be understood that this disclosure is not limited to particular methods, reagents, compounds compositions or biological systems, which can of course vary. It is also to be understood that the terminology used herein is for the purpose of describing particular embodiments only, and is not intended to be limiting.

As will be understood by one skilled in the art, for any and all purposes, particularly in terms of providing a written description, all ranges disclosed herein also encompass any and all possible subranges and combinations of subranges thereof. Any listed range can be easily recognized as sufficiently describing and enabling the same range being broken down into at least equal halves, thirds, quarters, fifths, tenths, etc. As a non-limiting example, each range discussed herein can be readily broken down into a lower third, middle third and upper third, etc. As will also be understood by one skilled in the art all language such as "up to," "at least," "greater than," "less than," and the like, include the number recited and refer to ranges which can be subsequently broken down into subranges as discussed above. Finally, as will be understood by one skilled in the art, a range includes each individual member.

All publications, patent applications, issued patents, and other documents referred to in this specification are herein incorporated by reference as if each individual publication, patent application, issued patent, or other document was specifically and individually indicated to be incorporated by reference in its entirety. Definitions that are contained in text incorporated by reference are excluded to the extent that they contradict definitions in this disclosure.

Other embodiments are set forth in the following claims.

What is claimed is:

1. A process for preparing an electrolyte composition comprising:
    contacting stoichiometric amount of SrO, BaCO$_3$, CeO$_2$, ZrO$_2$, Y$_2$O$_3$, and Sm$_2$O$_3$ powders to mix them together in presence of alcohol, acetone, or water;
    grinding the mix using agate mortar and pestle; and
    sintering the mixed powders to obtain the electrolyte composition which shows highest power density of about 697 mW/cm2 at temperature about 600° C., the stoichiometric amount producing an electrolyte composition Sr1 $Sr_{1-x}Ba_xCe_{0.5}Zr_{0.35}Y_{0.1}Sm_{0.05}O_{3-\delta}$ wherein x=0 to 0.99, and $\delta$=0 to 0.1.

2. The process of claim 1 further comprises triple doping of BaCeO$_3$ and BaZrO$_3$ in Sr, Y, and Sm.

3. The process of claim 1, wherein reaction taking place during the contacting, grinding and sintering of the powders is a solid state reaction.

4. The process of claim 1, wherein a hydraulic press is used to make 13 mm diameter pallets by pressing at pressure about 4 psi and temperature at about 1400° C.

5. The process of claim 1, wherein the sintering takes place from temperature about 900° C. to 1450° C. for up to about 8 hours, wherein heating and cooling rate is about 5° C./min while sintering at 1450° C.

6. The process of claim 1, wherein the grain size of the composition is controlled by varying amount of Sr and Ba while keeping percentage composition of Ce, Zr, Y, and Sm fixed.

7. The process of claim 1, wherein value of x is any one selected from the group consisting of 0, 0.1, 0.3, 0.5, 0.7, 0.9, and $\delta$ is the oxygen deficiency which is calculated based on the chemical formula of the composition.

* * * * *